US007966122B2

(12) United States Patent
Flynn et al.

(10) Patent No.: US 7,966,122 B2
(45) Date of Patent: Jun. 21, 2011

(54) SYSTEM AND METHOD FOR FLIGHT PLAN DATA CAPTURE

(75) Inventors: Lorraine Flynn, Newton, MA (US); Mary Flynn, Newton, MA (US); James Steinberg, Melrose, MA (US)

(73) Assignee: FlightView Inc., Allston, MA (US)

( * ) Notice: Subject to any disclaimer, the term of this patent is extended or adjusted under 35 U.S.C. 154(b) by 1392 days.

(21) Appl. No.: 11/433,065

(22) Filed: May 12, 2006

(65) Prior Publication Data

US 2006/0259234 A1 Nov. 16, 2006

Related U.S. Application Data

(60) Provisional application No. 60/681,181, filed on May 13, 2005.

(51) Int. Cl.
*G01C 21/00* (2006.01)
*G06F 15/00* (2006.01)

(52) U.S. Cl. ........................................ 701/202; 701/208

(58) Field of Classification Search .................. 705/5, 6; 707/3; 379/88.18, 88.8; 701/202, 203, 10, 701/206, 208, 3; 340/971, 973
See application file for complete search history.

(56) References Cited

U.S. PATENT DOCUMENTS 4,774,670 A 9/1988 Palmieri ........................ 364/446
5,051,910 A 9/1991 Liden ............................ 364/446
5,265,023 A 11/1993 Sokkappa ..................... 364/439
6,134,500 A * 10/2000 Tang et al. .................... 701/202
6,199,008 B1 3/2001 Aratow et al.
6,278,965 B1 * 8/2001 Glass et al. ..................... 703/22
6,922,631 B1 * 7/2005 Dwyer et al. ................. 701/206
7,363,319 B2 * 4/2008 Cappellini ............................ 1/1
7,546,206 B1 * 6/2009 Miller et al. .................. 701/210
(Continued)

FOREIGN PATENT DOCUMENTS

GB 2 327 517 1/1999

OTHER PUBLICATIONS

Haerne, R. A., et al "Airline Performance Modelling to Support Schedule Development: An Application Case Study", *Proceedings of the 1988 Winter Simulation Conference*, Dec. 12, 1988, pp. 800-806.

(Continued)

*Primary Examiner* — Ronnie Mancho
(74) *Attorney, Agent, or Firm* — Sunstein Kann Murphy & Timbers LLP

(57) ABSTRACT

A system and method for providing to a user a candidate list of flight plans that specify one or more planned routes of flight from one location to another location, such routes satisfying certain criteria. These criteria include ranking the candidate list of flight plans according to the probability that the flight plan may be allowed or cleared by a controlling authority based on historic cleared flight plans; further qualifying this list by considering only candidate flight plans cleared during specified weather conditions; or specified time periods; or requested speed and/or altitude and/or aircraft type of flight parameters. Various embodiments include providing the candidate list of flight plans to the user by means of a communication system that is composed of a combination of a wide-area network, a wireless network or the internet. Additionally, an embodiment includes providing the flight plan data to a global positioning system (GPS) of a user.

33 Claims, 10 Drawing Sheets

U.S. PATENT DOCUMENTS

| | | | | |
|---|---|---|---|---|
| 2003/0055689 | A1* | 3/2003 | Block et al. | 705/5 |
| 2003/0109266 | A1 | 6/2003 | Rafiah et al. | |
| 2004/0030593 | A1* | 2/2004 | Webster et al. | 705/13 |
| 2004/0039617 | A1* | 2/2004 | Maycotte et al. | 705/5 |
| 2004/0183695 | A1 | 9/2004 | Ruokangas et al. | |
| 2005/0080551 | A1* | 4/2005 | Ledingham et al. | 701/120 |
| 2005/0096946 | A1* | 5/2005 | Janakiraman et al. | 705/5 |
| 2005/0178903 | A1* | 8/2005 | Boorman et al. | 244/118.5 |
| 2005/0187812 | A1* | 8/2005 | Boedi et al. | 705/10 |
| 2005/0220278 | A1* | 10/2005 | Zirngibl et al. | 379/67.1 |
| 2005/0288831 | A1* | 12/2005 | Lusardi et al. | 701/3 |
| 2006/0089760 | A1* | 4/2006 | Love et al. | 701/4 |
| 2006/0106768 | A1* | 5/2006 | van Deursen | 707/3 |

OTHER PUBLICATIONS

Wieland, F. "Parallel Simulation for Aviation Applications", *Proceedings of the 1988 Winter Simulation Conference*, Dec. 16, 1998, pp. 1191-1198.

ArincOpCenter web site page, pp. 1-2, pre 2004.

Web page from icarus.redlaviation.com pp. 1-3, pre 2004.

*International Search Report and Written Opinion of the International Searching Authority*, International Searching Authority, International Application No. PCT/US2006/018817, Dec. 5, 2006, 13 pages.

* cited by examiner

| Sequence Number | Time Stamp (ddmmhhss) | Facility Identifier | Message Type | Flight Identifier | Aircraft Type and Equipment | Cruise Speed (Kts) | Departure Point | Departure Time | Altitude (100') |
|---|---|---|---|---|---|---|---|---|---|
| A00B | 04153438 | KZNY | FZ | N472QS/488 | GLF4/Q | 0465 | TEB | P1806 | 430 |

| Route (combo of fixes and airways) | Estimate Time en Route |
|---|---|
| TEB..WHITE.J209.ORF.J174.DIW.AR14.METTA.AR1.HOBEE.SURFN7.PBI | /0210 |

FIG. 3

| Data Field | Sample Data |
|---|---|
| Year | 2005 |
| Month | 1 |
| Day | 31 |
| Hour | 13 |
| Minute | 51 |
| Second | 48 |
| Flight/tail Number | UAL1296 |
| Status | Approved |
| Equipment Prefix | B |
| Aircraft Type | B763 |
| Equipment Suffix | Q |
| Cruise Speed (Kts) | 465 |
| Dep. Point | LAX |
| Arr. Point | DEN |
| Dep. Time | P1400 |
| Altitude in 100's of feet | 390 |
| Estimated Time Enroute | 204 |
| Number of Flight Path Descriptors | 7 |
| Flight Path Descriptor | LAX |
| Flight Path Descriptor | LAXX5 |

| Data Field | Sample Data |
|---|---|
| Flight Path Descriptor | DAG |
| Flight Path Descriptor | J146 |
| Flight Path Descriptor | HBU |
| Flight Path Descriptor | POWDR5 |
| Flight Path Descriptor | Den |
| Flight Path Descriptor | |
| Number of Flight Path Fixes | 13 |
| Flight Path Fix | LAX |
| Flight Path Fix | LAXX5 |
| Flight Path Fix | DAG |
| Flight Path Fix | MISEN |
| Flight Path Fix | CLARR |
| Flight Path Fix | LAS |
| Flight Path Fix | NOOTN |
| Flight Path Fix | BETHL |
| Flight Path Fix | FREDD |
| Flight Path Fix | DVC |
| Flight Path Fix | HBU |
| Flight Path Fix | POWDR |
| Flight Path Fix | DEN |
| | |

FIG. 4

| Fix | Latitude(lat) | Longitude(lon) | Weather Station |
|---|---|---|---|
| DAG | 34.96245 | -116.57816 | KDAG |
| LAS | 36.07970 | -115.15979 | KLAS |
| LAX | 33.94254 | -118.40807 | KLAX |
| | | | |
| | | | |

FIG. 5

| Data Field | Sample Data | Weather |
|---|---|---|
| Number of Flight Path Fixes | 13 | |
| Flight Path Fix | LAX | 2 |
| Flight Path Fix | LAXX5 | 2 |
| Flight Path Fix | DAG | 2 |
| Flight Path Fix | MISEN | 2 |
| Flight Path Fix | CLARR | 2 |
| Flight Path Fix | LAS | 2 |
| Flight Path Fix | NOOTN | 2 |
| Flight Path Fix | BETHL | 3 |
| Flight Path Fix | FREDD | 4 |
| Flight Path Fix | DVC | 5 |
| Flight Path Fix | HBU | 5 |
| Flight Path Fix | POWDR | 6 |
| Flight Path Fix | DEN | 6 |
| | | |

FIG. 6

Flight View® Flight Planner

| Your Trip | | |
|---|---|---|
| Departs From: | Teterboro Airport (TEB) | 11:30 AM EST |
| Arriving at: | Palm Beach Intl (PBI) | |
| Aircraft: | Gulfstream 200 | |

Flight Plans for Your Trip
Ranked by Historic Clearance (Activated) Rate for Anticipated Weather

| Filed | Cleared | Flight Path |
|---|---|---|
| 8 | 15 | TEB..WHITE.J209.ORF.J174.DIW.AR14.METTA.AR1.HOBEE.SURFN7.PBI |
| 16 | 3 | TEB..WHITE.J209.J79.KATZN.J193.WEAVR.J121.CHs.J79.OMN.SURFN7.PBI |

FIG. 8

SYSTEM AND METHOD FOR FLIGHT PLAN DATA CAPTURE

PRIORITY

This application claims priority to U.S. Provisional Patent Application Ser. No. 60/681,181, filed May 13, 2005, and which is hereby incorporated by reference in its entirety.

TECHNICAL FIELD

The present invention relates to systems and methods for providing candidate flight plan data to users.

BACKGROUND

It is known in the prior art to allow a user to enter flight plan information and file a flight plan via the Internet with an aviation authority, such as the Federal Aviation Administration (FAA). When a pilot files a flight plan with the FAA, the FAA acknowledges that it has received it and the flight plan is considered “accepted”. However, use of this procedure does not require the FAA to allow that flight plan to be followed. Depending on air traffic and weather conditions, the FAA may modify the flight plan route. Typically before takeoff, the pilot will contact the FAA and find out what route was cleared or “activated”.

It is also known in prior art to extract and store flight plan data available from air traffic data, and to provide such flight plan data to a user. It also known to store flight plan data for previous flights between a departure airport and a destination airport and provide this flight plan data to a user. Additionally, it is known to extract from this stored flight plan data that which is associated with a selected type of aircraft.

SUMMARY OF THE INVENTION

In a first embodiment of the invention there is provided a method for providing, to a user, flight plan data for an air trip of interest from a first location to a second location, the method includes: extracting and storing flight plan data from live air traffic data collected over a period of a plurality of days, the flight plan data stored in a flight plan data base, accessible by a starting location and an ending location and including at least one of as-filed, as-cleared and as-flown flight plans, wherein at least one of time data and weather data pertinent to flight plan data in the flight plan database is also stored; accessing and abstracting, from the flight plan data base, flight plan data pertinent to the trip of interest; and providing the abstracted flight plan data to the user.

The method optionally includes storing both time data and weather data pertinent to flight plan data in the flight plan database.

The method optionally includes storing time data pertinent to flight plan data in the flight plan database.

The method optionally includes storing weather data pertinent to flight plan data in the flight plan database.

In a further related embodiment of the invention, there is provided a method of associating at least one of anticipated weather conditions and scheduled time of day for the air trip of interest and using such association in accessing flight plan data from the flight plan data base.

The method optionally includes associating both anticipated weather conditions and scheduled time of day for the air trip of interest and using such association in accessing flight plan data from the flight plan data base.

The method optionally includes associating scheduled time of day for the air trip of interest and using such association in accessing flight plan data from the flight plan data base.

The method optionally includes associating anticipated weather conditions for the air trip of interest and using such association in accessing flight plan data from the flight plan data base.

The method optionally includes providing the abstracted flight plan data to the user using a wireless communications network. The wireless communications network may be in communication with a wide area network and receive the abstracted flight plan data over the wide area network. The wide area network may be the internet. The wireless communications network may be a data link in a mobile telephone system. The abstracted flight plan data is communicated to a wireless transceiver of the user that is in communication with the wireless communications network.

In another related embodiment the method optionally includes providing the abstracted flight plan data to the user communicating such data over a wide area network. The wide area network may be the internet.

In a further related embodiment, when the flight plan data pertinent to the trip of interest relates to a plurality of accessed routes, the method includes: ranking each of the accessed routes according to an estimated probability that such route would be selected as part of a cleared flight plan for the trip of interest, and providing, to the user, information based on such ranking.

The method optionally includes associating at least one of anticipated weather conditions and scheduled time of day for the air trip of interest and using such association in ranking each of the accessed routes.

The method optionally includes associating both anticipated weather conditions and scheduled time of day for the air trip of interest and using such association in ranking each of the accessed routes.

The method optionally includes associating scheduled time of day for the air trip of interest and using such association in ranking each of the accessed routes.

The method optionally includes associating anticipated weather conditions for the air trip of interest and using such association in ranking each of the accessed routes.

The method optionally includes associating aircraft type for the air trip of interest and using such association in ranking each of the accessed routes.

The method optionally includes associating at least one of altitude, speed information, and time en route, for the trip of interest and using such association in ranking each of the accessed routes.

In a further related embodiment there is a method of providing the abstracted flight plan data to the user before the user has obtained regulatory clearance to make the trip of interest and to facilitate proposing by the user of a route that is likely to obtain such clearance.

In a further related embodiment there is a method for providing, to a user, flight plan data for an air trip, for which the flight has not begun, from a departure airport to a destination airport, the method comprising: extracting flight plan data, from live air traffic data, pertinent to the trip; providing flight plan data, derived from the extracted data, over a data link in a mobile telephone system to a wireless transceiver of a user. The wireless transceiver of the user may be in communication with a GPS system of the user, such GPS system being updatable with the routed flight plan data.

In a further related embodiment there is a method for providing, to a user, flight plan data for an air trip of interest from a first location to a second location, the method comprising: extracting and storing flight plan data from live air traffic data collected over a period of a plurality of days, the flight plan data stored in a flight plan data base, accessible by a starting location and an ending location and including at least one of as-filed, as-cleared and as-flown flight plans; accessing, from the flight plan data base, a plurality of routes pertinent to the trip of interest; ranking each of the accessed routes according to an estimated probability that such route would be selected as part of a cleared flight plan for the trip of interest; and providing, to the user, information based on such ranking.

Such ranking may be provided to the user before the user has obtained regulatory clearance to make the trip of interest and to facilitate proposing by the user of a route that is likely to obtain such clearance.

Optionally the method may include ranking each of the accessed routes by considering time of day of the trip of interest in relation to time of day associated with each of the accessed routes. This may optionally include ranking each of the accessed routes by considering day of the week of the trip of interest, and presence of any holiday on such day, in relation to day of the week, and the presence of any holiday on such day, associated with each of the accessed routes.

In a further related embodiment there is a method wherein ranking each of the accessed routes includes considering weather conditions expected for the trip of interest in relation to the weather conditions associated with each of the accessed routes.

In a further related embodiment there is a method wherein ranking each of the accessed routes includes considering aircraft type associated with the trip of interest in relation to aircraft type associated with each of the accessed routes.

The method optionally includes providing information based on such ranking to the user using a wireless communications network. The wireless communications network may be in communication with a wide area network and receive the abstracted flight plan data over the wide area network. The wide area network may be the internet. The wireless communications network may be a data link in a mobile telephone system. The abstracted flight plan data is communicated to a wireless transceiver of the user that is in communication with the wireless communications network.

In another related embodiment the method optionally includes providing the abstracted flight plan data to the user communicating such data over a wide area network. The wide area network may be the internet.

BRIEF DESCRIPTION OF THE DRAWINGS

The foregoing features of the invention will be more readily understood by reference to the following detailed description, taken with reference to the accompanying drawings, in which:

FIG. 3 is a sample flight plan record received in the Aircraft Situation Display for Industry data feed from the Federal Aviation Administration for use in accordance with an embodiment of the present invention.

FIG. 4 is a sample Flight Plan Database record in accordance with an embodiment of the present invention.

FIG. 5 shows a sample table that associates route fixes or waypoints with weather stations in accordance with an embodiment of the present invention.

FIG. 6 shows a sample table for storing weather condition in association with flight plan routes in accordance with an embodiment of the present invention.

FIG. 8 is a sample User Interface web page displaying a list of candidate flight plans ranked by highest number cleared for anticipated weather conditions in accordance with an embodiment of the present invention.

DETAILED DESCRIPTION OF SPECIFIC EMBODIMENTS

Figure 1:
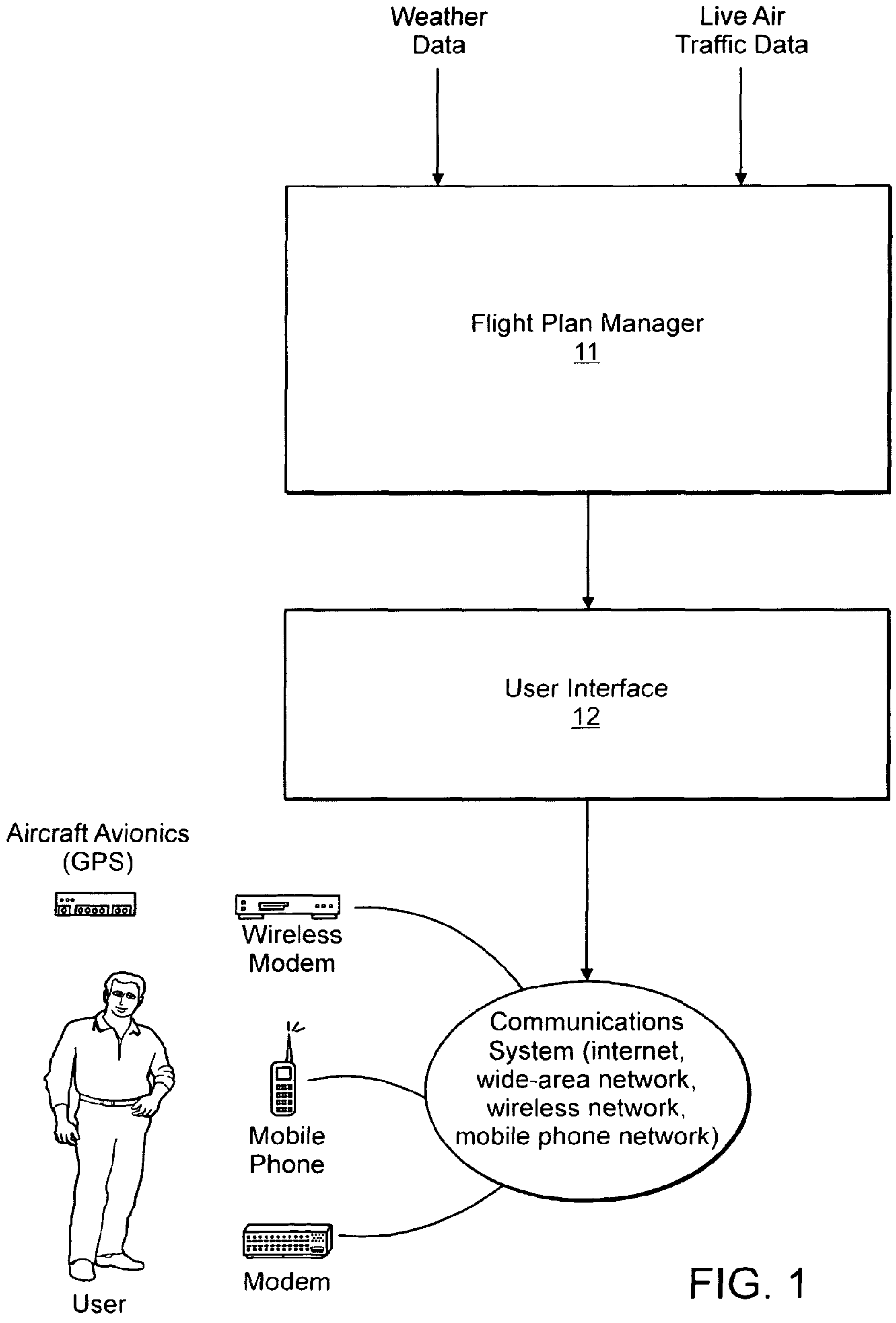
FIG. 1 is a block diagram of an implementation of a method in accordance with the present invention.

Definitions. As used in this description and the accompanying claims, the following terms shall have the meanings indicated, unless the context otherwise requires:

FIG. 1 is a block diagram providing an overview of data flow in accordance with a preferred embodiment of a method in accordance with the present invention. In this embodiment it can be seen from the diagram that providing a candidate list of flight plan data, to a user, for an air trip of interest depends upon receiving live air traffic data, and optionally weather data, processing and managing that data in accordance with the Flight Plan Manager 11, and providing the abstracted flight plan data to a user via interface 12.

Figure 2:
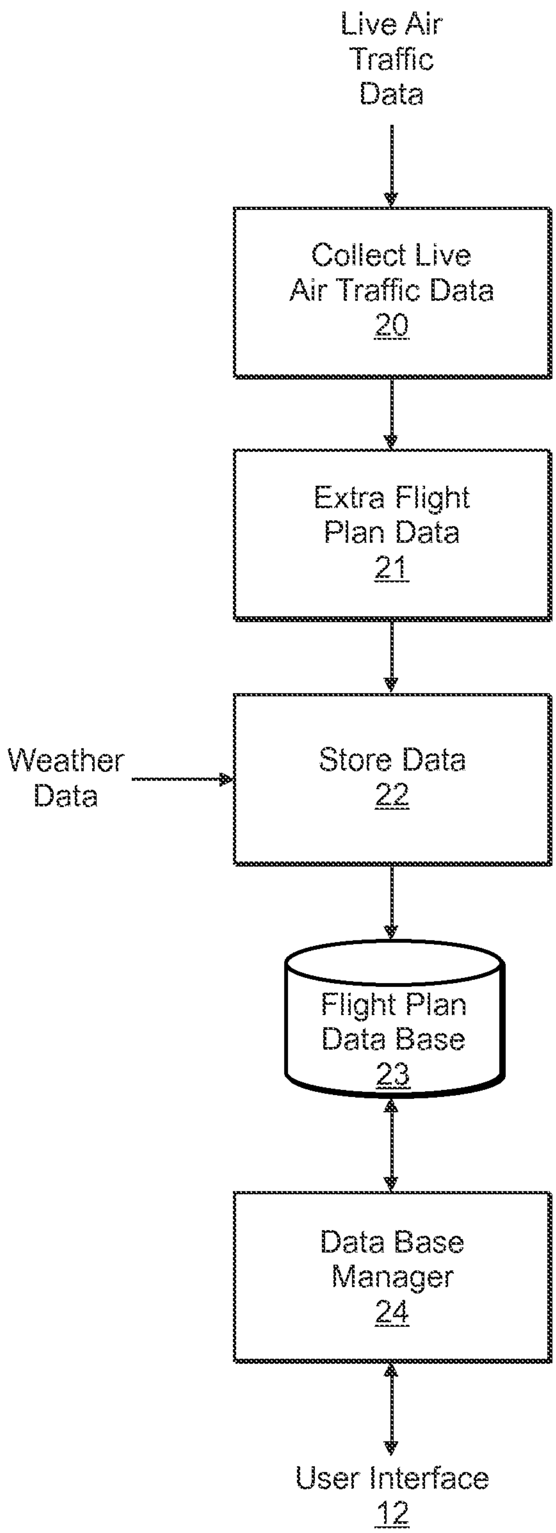
FIG. 2 is a block diagram showing detail of the flight planning manager 11 of FIG. 1.

FIG. 2 is a block diagram showing further detail of the Flight Plan Manager (FPM) 11 of FIG. 1. It can be seen that in accordance with process 21 the flight plan data is extracted from live air traffic data. The live air traffic data can be received from an aviation authority or aviation enterprise. Typically, flight plan data that can be extracted are flight plans that were filed (as-filed), flight plans that were cleared or activated by the aviation authority (as-cleared), and flight plan routes that were actually flown (as-flown). As-filed flight plans can be received from aviation enterprises that currently allow a user to file a flight plan with an aviation authority via the Internet. As-cleared and as-flown flight plans can be received from aviation authorities.

Each flight plan would typically include: the airline and flight identifier or tail number, aircraft type, altitude, speed, status of flight, departure and arrival airports, departure and arrival times, a flight plan route described by fixes and airways. Also, data can be derived from the flight plan data, for example, time en route and distance. This information can be stored with the flight plan data. For the purposes of this description, extracted flight plan data shall include the extracted flight plan data and any data derived from the extracted flight plan data, such as the time en route or distance.

In one embodiment, live air traffic data is received from the Federal Aviation Administration (FAA). The FAA provides as-cleared and as-flown flight plan data in its Aircraft Situation Display for Industry (ASDI) data. FIG. 3 shows a sample record of an as-cleared flight plan that is received in the ASDI data. It can be noted in FIG. 3 that a flight plan data record received from the FAA contains a time stamp showing day, hour, minutes and seconds, flight identifier (tail number or airline and flight number), aircraft type and equipment, cruise speed, departure airport or point, departure time, altitude, route, and estimated time enroute. As shown in FIG. 3 the flight plan data contains only the day of the month and the time, and so the full date of day, month and year is set to the current day, month and year and stored as such.

In accordance with process 22 of FIG. 2 in a simple embodiment, the extracted flight plan data is stored in a Flight Plan Database 23 in association with the date and time of the flight plan. FIG. 4 shows an extracted flight plan stored in a data base record. The flight plan is for United Airlines Flight 1296 flying from Los Angeles (LAX) to Denver (DEN). A flight plan route is typically described in a filed flight plan by a list of airports, fixes, jet routes, and airways. In this embodiment both the flight plan route as filed and the corresponding list of fixes or waypoints that make up that route are stored in the data record. It can be noted in FIG. 4 that part of the filed flight plan route "DAG.J146.HBU is delineated by the fixes: "DAG, MISEN, CLARR, LAS, NOOTN, BETHL, FREDD, DVC and HBU". Both the flight path as filed and the flight path defined by fixes or waypoints are stored.

Again referring to process 22 of FIG. 2, in a related embodiment, the extracted flight plan data may be stored in the Flight Plan Database 23 in association with weather data pertinent to the flight plan data. The weather data may be obtained from commercial weather data vendors or from government agencies, such as the United States National Oceanic and Atmospheric Administration (NOAA). In a further embodiment of process 22 of FIG. 2, the extracted flight plan data are stored in association with both (i) the date and time of the flight plan and (ii) weather data pertinent to the flight plan data.

FIG. 5 shows a sample table that associates weather stations with route fixes. Weather stations typically issue weather reports at specified intervals, or whenever significant weather changes occur. Weather conditions may be stored as a numerical code according to a severity rating. For example, significant weather conditions, such as freezing rains and snow, may be designated by 8 on a scale of 0-10. Alternatively each significant weather condition may be stored by weather category, such as one category for precipitation, another category for winds, and yet another category for visibility. FIG. 6 shows a simple embodiment where each flight path fix, as shown in FIG. 4, is associated with a single weather condition code for a NOAA Terminal Area Forecast (TAF). In a simple embodiment the time of departure for the trip is the time of the forecast for each fix.

In these embodiments the flight plan data, and optionally the weather data, are collected 20 over a period of a plurality of days, for example, three years.

Figure 7:
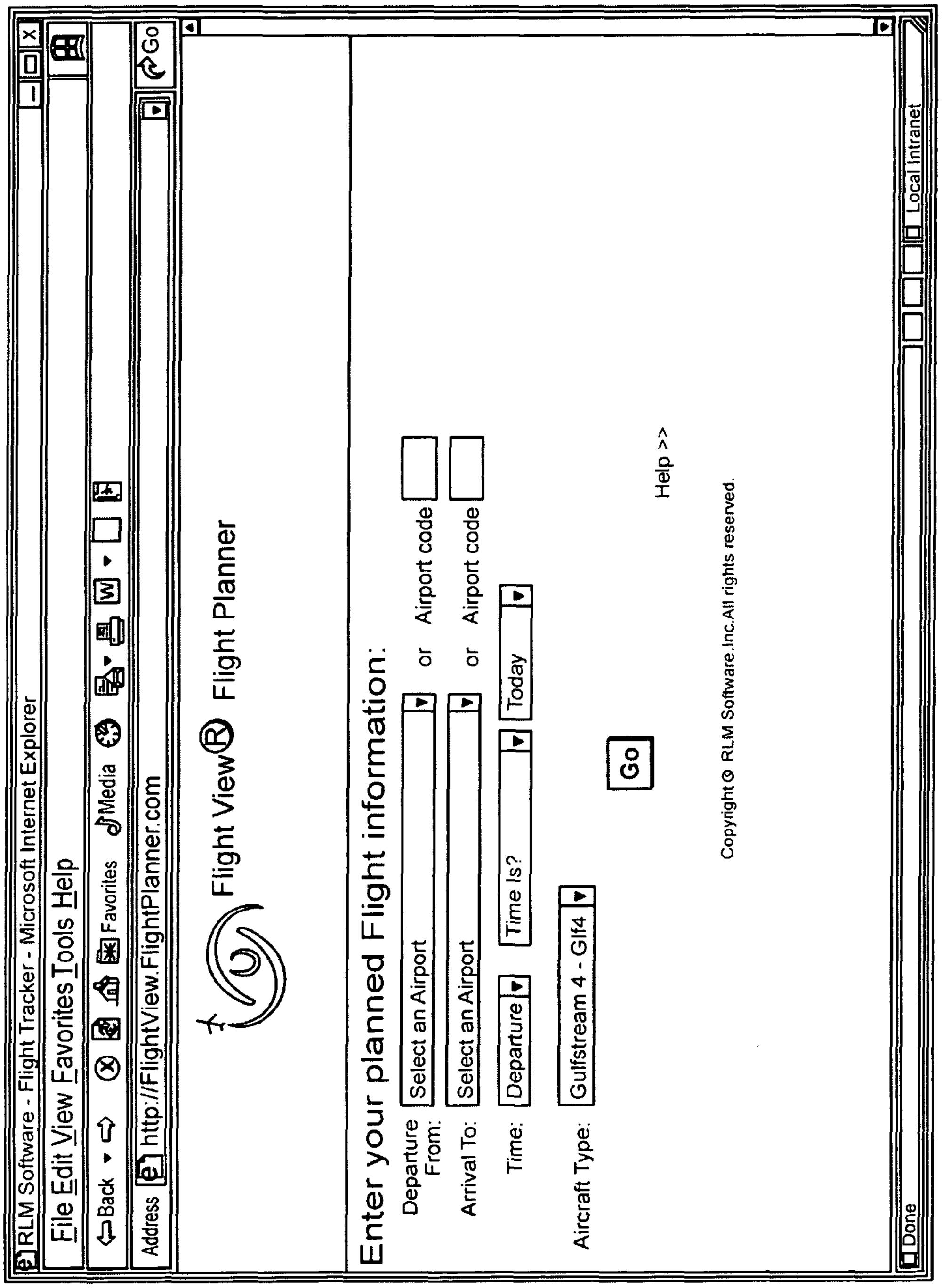
FIG. 7 is a sample User Interface web page that allows the user to enter information for an air trip of interest in accordance with an embodiment of the present invention.

The Database Manager 24 of FIG. 2 is able to receive a request from a user via the User Interface for flight plan data for an air trip of interest. This air trip may be specified by a first location to a second location. For example, the first location may be the departure airport and the second location may be the arrival airport. Alternatively the first location may be an aeronautical fix or waypoint en route and the second location an arrival airport. Similarly, the second location may be a waypoint en route. FIG. 7 shows a simple embodiment of the present invention by which a web page allows the user to specify information about an air trip. The user is able to enter the departure and arrival airport, time and date of departure (or arrival), and the aircraft type. When the user clicks the "Go" button, the browser transmits the information over the Internet to the User Interface Server and User Interface Process. The User Interface Process processes the information and passes the request onto the Database Manager The Database Manager associates the anticipated weather conditions and scheduled time of day for the air trip of interest and uses such association in accessing flight plan data from the flight plan database. In a further embodiment, the Database Manager associates both the anticipated weather conditions and scheduled time of day for the air trip of interest and uses such association in accessing flight plan data from the flight plan database. In yet a further embodiment, when the Database Manager associates a plurality of flight plan data pertinent to the trip of interest, the Database Manager ranks each of the accessed routes according to an estimated probability that such route would be selected as part of a cleared flight plan for the trip of interest.

As an example of such an embodiment, the user selects, on the web page, a departure airport of Teterboro (TEB), New Jersey, and an arrival airport of West Palm Beach (PBI), Florida, and a departure time of 11:30 AM (EST). This information is passed from the User Interface Program to the Database Manager. The Database Manager then retrieves from the Flight Plan Database all flights routed between TEB and PBI. For each route retrieved, the Database Manager determines if the weather conditions en route, say at specific fixes or waypoints, match or perhaps are somewhat worse than the anticipated weather en route. The Database Manager formats and ranks the results, showing the most frequently cleared flight plan through to the least frequently cleared flight plan.

As shown in FIG. 1, the Database Manager transmits the flight plan data results to the User Interface 12. In a simple embodiment, the User Interface then displays the information for the user as shown in FIG. 8. The ranking shown in FIG. 8 is for a trip from TEB to PBI where the flight plans are ranked showing the historic number of cleared versus the number filed for flight plans matching the anticipated weather en route for the flight plan of interest. Note that the number of "Cleared" flight plans exceeds the number "Filed" for the highest ranked route. This is because a user may file a flight plan (as-filed) but will find out later that the flight plan was replaced by a different flight plan (as-cleared).

Figure 9:
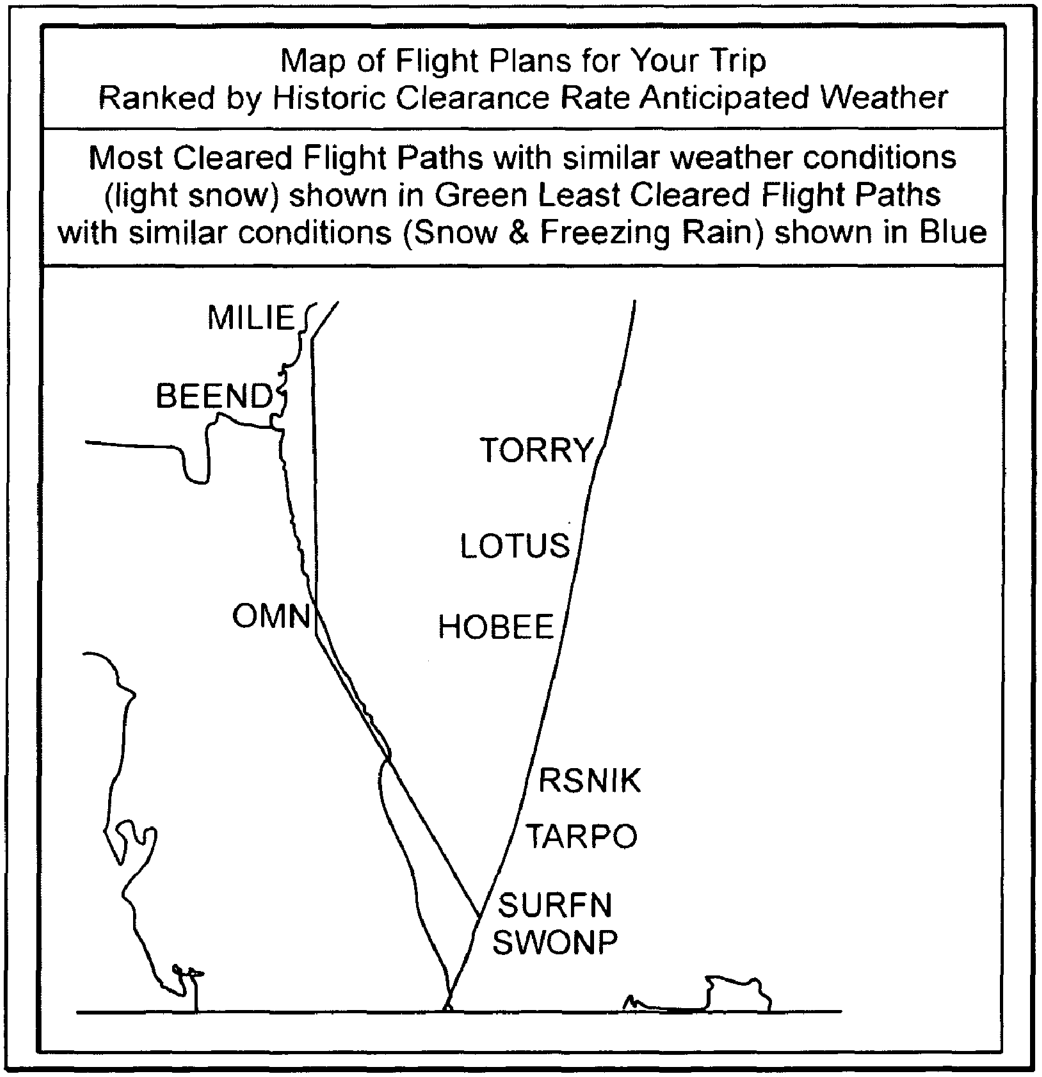
FIG. 9 is sample web page graphically displaying a section of flight routes using color coding to show ranking of flight plan routes in accordance with an embodiment of the present invention.

FIG. 9 shows a further embodiment where the User Interface shows the ranked flight plans by geographically displaying the flight plan routes indicating the most preferred or cleared flight plans in green (shown on the left) and the least cleared flight plans in blue (shown on the right).

In another embodiment, the Database Manager 24 optionally associates aircraft type for the air trip of interest and uses such association in ranking each of the accessed routes. Additionally the Database Manager may associate at least one of altitude, speed information, and time en route, for the trip of interest and uses such association in ranking each of the accessed routes. For example, the user could select a time en route and an aircraft type as criteria for ranking each of the accessed routes.

In a further embodiment the Flight Plan Manager receives and extracts flight plan data, but not weather data. As previously shown in FIG. 2 flight plan data is extracted from live air traffic data such as the ASDI data. The flight plan data is extracted and stored in the Flight Plan Database. In this embodiment weather data is not received and the flight plan data is not associated with weather data.

Figure 10:
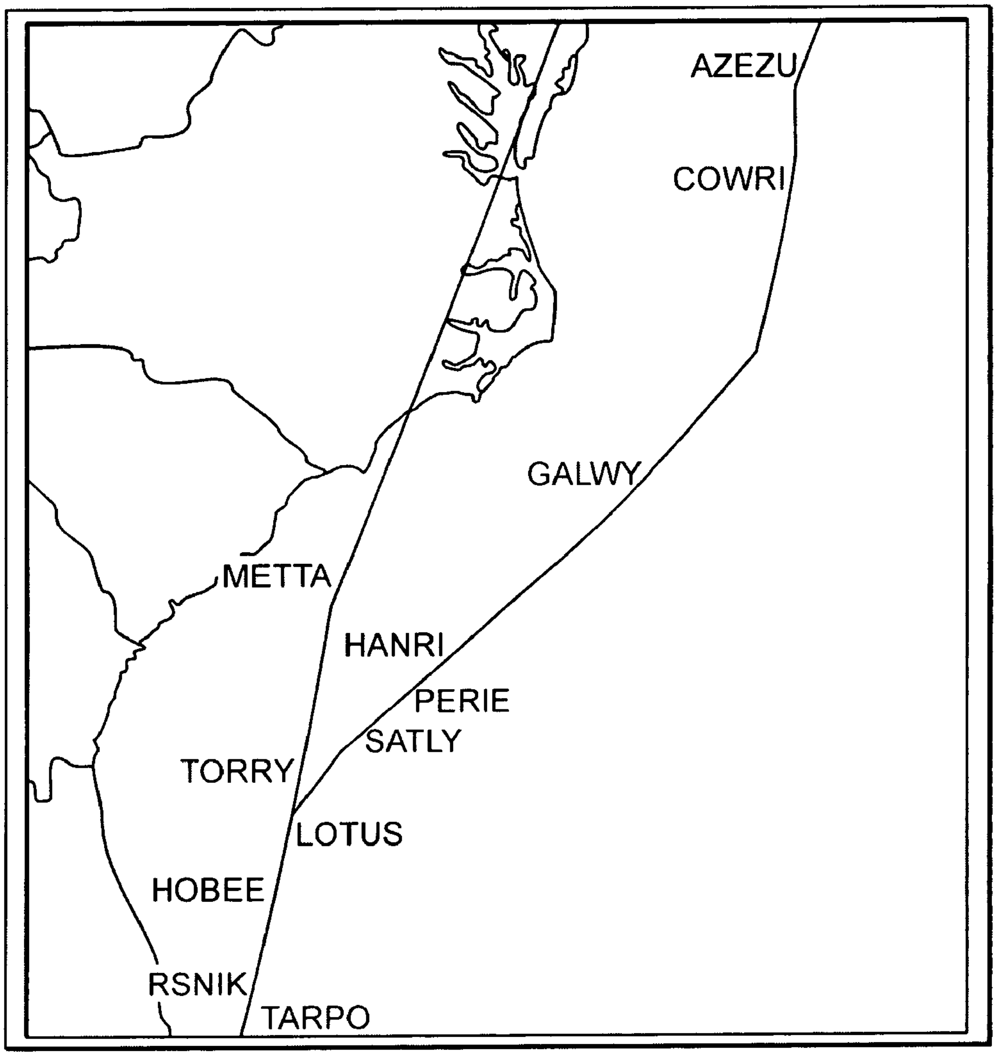
FIG. 10 is a sample graphic displaying sections of alternative flight paths in accordance with an embodiment of the present invention.

Also as previously shown in FIG. 1 the User Interface process 12 allows the user to enter flight trip information including, for example, departure location, arrival location, departure time, and aircraft type. The User Interface process passes the flight trip information on to the Database Manager 24 of FIG. 2. Using the information, including information that can be extrapolated from the information, such as determining maximum altitude and speed based on the aircraft type, the Database Manager 24 retrieves all historic flights that were cleared for that trip. The information is processed to rank the different flight paths according to the time of day. This information is received by the User Interface 12 and presented to the user. For example, there may be two main routes used between Teterboro, N.J. (TEB) and West Palm Beach, Fla. (PBI). The western most route may show to be the most cleared route for the morning, say 8:00 AM-12:00 PM EST. But the eastern most route may be the route predominantly cleared for the afternoon, say noon to 7:00 PM EST. FIG. 10 shows the southern portion of two different routes used to fly from TEB to PBI that could be color coded to rank the preferred route (historically most "as-cleared" route) for a particular time of day.

In a further related embodiment the Database Manager 24 provides to the user abstracted flight plan data that contains a plurality of accessed routes ranked according to an estimated probability that such route would be selected as part of a cleared flight plan for the trip of interest. This flight plan data is provided to the user before the user has obtained regulatory clearance to make the trip of interest and facilitates proposing by the user of a route that is likely to obtain such clearance. The user may then select the best flight plan, say by clicking on it, and the User Interface 12 passes the flight plan onto a flight plan filing system.

In a further embodiment the flight plan data may be communicated to the user via a wireless communications network. The wireless communications network may be in communications with a wide area network and receive the flight plan data over the wide area network. The wide area network may be an internet.

In a further embodiment the wireless communications network includes a data link in a mobile telephone system and providing the abstracted flight plan data to the user includes providing such data to a wireless transceiver of the user that is in communication with the wireless communications network.

Figure 11:
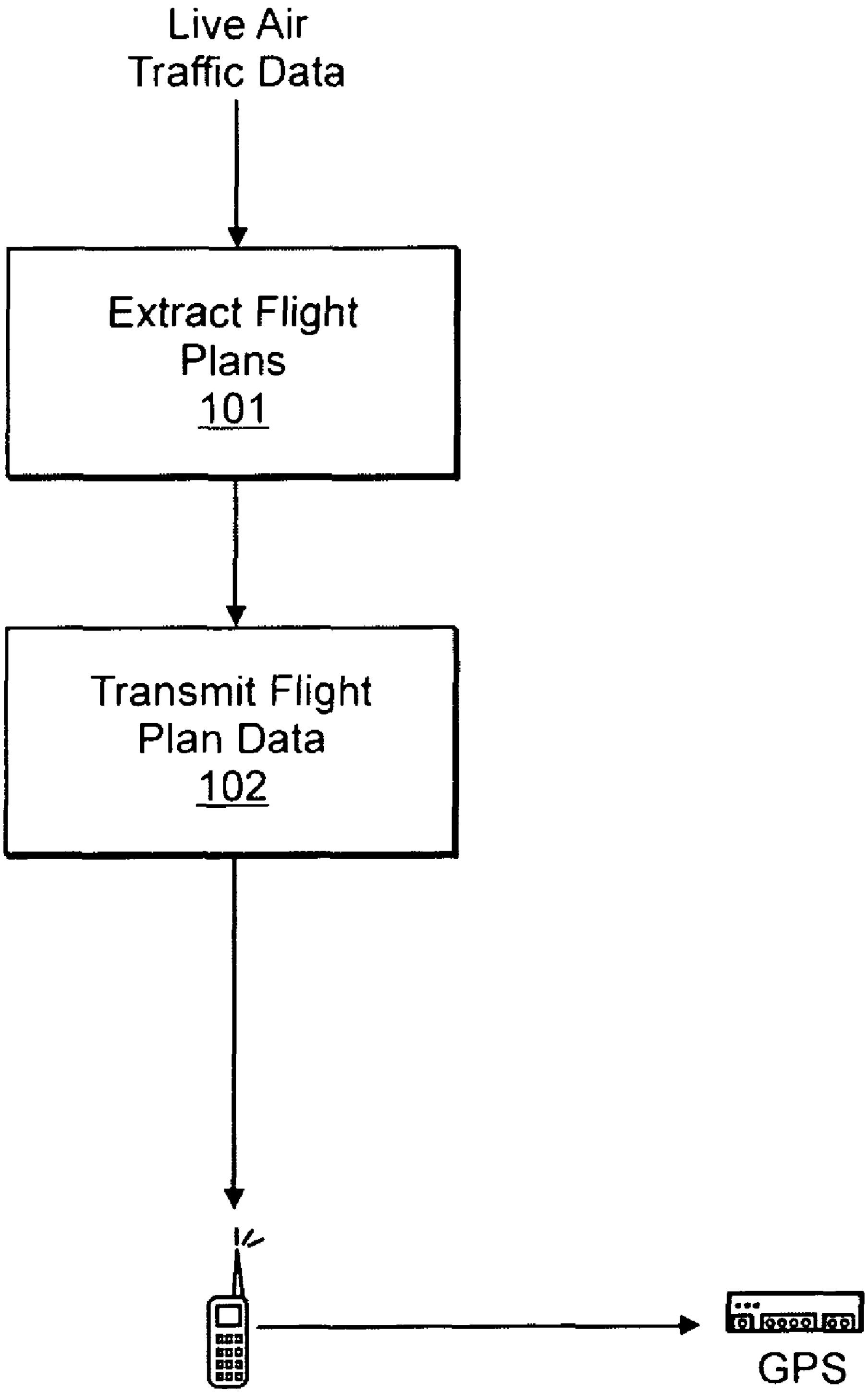
FIG. 11 is a block diagram of an implementation of a method to transmit flight plan data to a user over a data link in a mobile telephone system to a wireless transceiver of a user in accordance with an embodiment of the present invention.

FIG. 11 details a related embodiment where the user is provided flight plan data for an air trip, for which the flight has not begun. In accordance with process 101 the flight plan data pertinent to the trip are extracted from the live air traffic data. Optionally, the extracted data may be stored. In accordance with process 102 the flight plan data, derived from the extracted data, are provided to the user over a data link in a mobile telephone system to a wireless transceiver of a user. The wireless transceiver of the user may be in communication with a GPS system of the user, such GPS system being updatable with the routed flight plan data.

What is claimed is:

1. A method for providing, to a user, flight plan data for an air trip of interest from a first location to a second location, the method comprising:

collecting over a period of days air traffic data including at least one of an as-filed, an as-cleared and an as-flown flight plan from an air traffic data feed;

extracting a plurality of the flight plans from the collected air traffic data, the extracted flight plans each including a flight plan route;

storing the extracted flight plans in a database;

storing at least one of time data and weather data pertinent to the extracted flight plans in the database;

receiving at a database manager a request from a user for flight plan data associated with the air trip of interest;

accessing and abstracting, from the flight plan database, flight plan data pertinent to the trip of interest, wherein the flight plan data pertinent to the trip of interest relates to a plurality of accessed routes;

ranking each of the accessed routes according to an estimated probability that such route would be selected as part of a cleared flight plan for the air trip of interest; and providing information, based on such ranking, from the abstracted flight plan data including a flight plan route to the user.

2. A method according to claim 1, wherein both time data and weather data pertinent to flight plan data in the flight plan database are stored therein.

3. A method according to claim 2, further comprising:

associating both anticipated weather conditions and scheduled time of day for the air trip of interest and using such association in accessing flight plan data from the flight plan data base.

4. A method according to claim 1, wherein time data pertinent to flight plan data in the flight plan database is stored therein.

5. A method according to claim 4, further comprising:

associating scheduled time of day for the air trip of interest and using such association in accessing flight plan data from the flight plan data base.

6. A method according to claim 1, wherein weather data pertinent to flight plan data in the flight plan database is stored therein.

7. A method according to claim 6, further comprising:

associating anticipated weather conditions for the air trip of interest and using such association in accessing flight plan data from the flight plan data base.

8. A method according to claim 1, further comprising:

associating at least one of anticipated weather conditions and scheduled time of day for the air trip of interest and using such association in accessing flight plan data from the flight plan data base.

9. A method according to claim 8, wherein providing the abstracted flight plan data to the user includes using a wireless communications network.

10. A method according to claim 9, wherein the wireless communications network is in communication with a wide area network and receives the abstracted flight plan data over the wide area network.

11. A method according to claim 10, wherein the wide area network is the internet.

12. A method according to claim 9, wherein the wireless communications network includes a data link in a mobile telephone system and providing the abstracted flight plan data to the user includes providing such data to a wireless transceiver of the user that is in communication with the wireless communications network.

13. A method according to claim 8, wherein providing the abstracted flight plan data to the user includes communicating such data over a wide area network.

14. A method according to claim 13, wherein the wide area network is the internet.

15. A method according to claim 1, further comprising:

associating at least one of anticipated weather conditions and scheduled time of day for the air trip of interest and using such association in ranking each of the accessed routes.

16. A method according to claim 1, further comprising:

associating both anticipated weather conditions and scheduled time of day for the air trip of interest and using such association in ranking each of the accessed routes.

17. A method according to claim 1, further comprising: associating scheduled time of day for the air trip of interest and using such association in ranking each of the accessed routes.

18. A method according to claim 1, further comprising: associating anticipated weather conditions for the air trip of interest and using such association in ranking each of the accessed routes.

19. A method according to claim 1, further comprising: associating aircraft type for the air trip of interest and using such association in ranking each of the accessed routes.

20. A method according to claim 1, further comprising: associating at least one of altitude, speed information, and time en route, for the trip of interest and using such association in ranking each of the accessed routes.

21. A method according to claim 1, wherein providing the abstracted flight plan data to the user includes doing so before the user has obtained regulatory clearance to make the trip of interest and to facilitate proposing by the user of a route that is likely to obtain such clearance.

22. A method for providing, to a user, flight plan data for an air trip of interest from a first location to a second location, the method comprising:

collecting over a period of days live air traffic data including at least one of an as-filed, an as-cleared and an as-flown flight plan from a live data feed;

extracting and storing flight plan data from the collected live air traffic data, the flight plan data stored in a flight plan database, accessible by a starting location and an ending location, the extracted flight plan data including a flight plan route;

accessing, from the flight plan database, a plurality of routes pertinent to the trip of interest; and ranking each of the accessed routes according to an estimated probability that such route would be selected as part of a cleared flight plan for the trip of interest, and providing, to the user, information based on such ranking.

23. A method according to claim 22, wherein providing to the user information based on such ranking includes doing so before the user has obtained regulatory clearance to make the trip of interest and to facilitate proposing by the user of a route that is likely to obtain such clearance.

24. A method according to claim 22, wherein ranking each of the accessed routes includes considering time of day of the trip of interest in relation to time of day associated with each of the accessed routes.

25. A method according to claim 24, wherein ranking each of the accessed routes also includes considering day of the week of the trip of interest, and presence of any holiday on such day, in relation to day of the week, and presence of any holiday on such day, associated with each of the accessed routes.

26. A method according to claim 24, wherein ranking each of the accessed routes includes considering weather conditions expected for the trip of interest in relation to the weather conditions associated with each of the accessed routes.

27. A method according to claim 22, wherein ranking each of the accessed routes includes considering aircraft type associated with the trip of interest in relation to aircraft type associated with each of the accessed routes.

28. A method according to claim 22, wherein providing information based on such ranking to the user includes using a wireless communications network.

29. A method according to claim 28, wherein the wireless communications network is in communication with a wide area network and receives the abstracted flight plan data over the wide area network.

30. A method according to claim 29, wherein the wide area network is the internet.

31. A method according to claim 22, wherein providing information based on such ranking to the user includes communicating such information over a wide area network.

32. A method according to claim 31, wherein the wide are network is the internet.

33. A method according to claim 28, wherein the wireless communications network includes a data link in a mobile telephone system and providing such information to the user includes providing such information to a wireless transceiver of the user that is in communication with the wireless communications network.

* * * * *